UNITED STATES PATENT OFFICE.

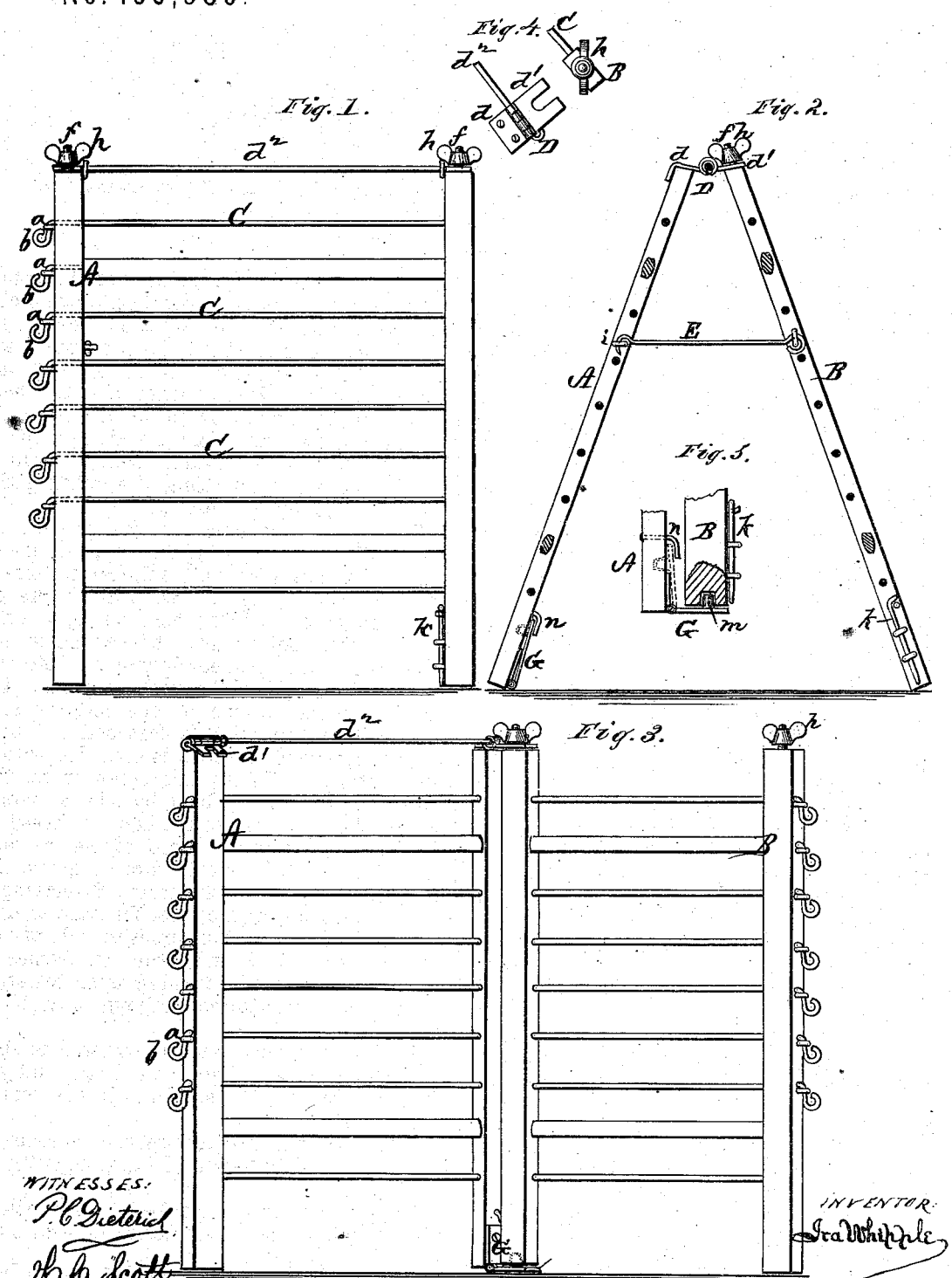

IRA WHIPPLE, OF MYSTIC RIVER, CONNECTICUT.

IMPROVEMENT IN CLOTHES-DRIERS.

Specification forming part of Letters Patent No. 160,980, dated March 16, 1875; application filed February 26, 1875.

*To all whom it may concern:*

Be it known that I, IRA WHIPPLE, of Mystic River, in the county of New London and State of Connecticut, have invented certain new and useful Improvements in Clothes-Driers; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of my invention consists in the construction and arrangement of a clothes-rack, to be used either in or out of the house, as will be hereinafter more fully set forth.

In the annexed drawing, Figure 1 is a front elevation of my clothes-rack as it appears when used out of doors. Fig. 2 is a vertical cross-section of the same. Fig. 3 is an elevation of the rack as it appears when used in the house.

My clothes-rack is composed of two frames, A and B, each frame consisting of two parallel side pieces or legs connected by suitable cross-bars. Each frame is provided with a series of galvanized-iron rods, C, passing horizontally through the side pieces thereof. One end of each rod is clinched on the outside of the frame, while the other end is curved to form a hook, $b$, and fastened by a staple, $a$, driven into the frame. The hooks $b\ b$ are for the purpose of hanging smaller articles of clothing on. The two frames A B are connected together at their upper ends by means of hinges, D D, of peculiar construction. Each hinge is composed of two leaves, $d$ and $d^1$, with a rod, $d^2$, connecting them in the same manner as the usual rivet for strap-hinges; but this rod extends clear across and unites the leaves of both hinges, so as to form a center rod in the clothes-rack to hang clothing on. The leaves $d$ of the hinges are permanently fastened on the upper ends of the side pieces of the frame A. The outer ends of the leaves $d^1$ are slotted or forked on lines at right angles with the joints, and placed over bolts $f\ f$, firmly attached in and projecting from the upper ends of the side pieces of the frame B. A thumb-nut, $h$, is screwed on, thereby fastening the leaf $d^1$ to its place on the frame B. When thus fastened the two frames are hinged together, and can be opened and closed at will. When opened they are held at any desired angle by means of a hook, E, fastened to one frame, and hooking on either of the rods on the other frame, or in a staple, $i$, thereby admitting of spreading the rack more or less, as desired.

The rack is fastened to the ground by means of a pin, $k$, sliding in loops on one of the legs or side pieces of each frame. These pins or stakes are formed with hooks on their upper ends, to be held on pins in the frames when not in use, and can be turned from them and pushed downward into the ground for holding the rack in place. On the lower end of one of the legs or side pieces of the frame A is fastened a hinge, G, the loose leaf of which is provided with a pin or stud, $m$. When this is not in use the leaf is folded up, and held by a hook or button, $n$, the stud entering a hole or recess in the leg. When it is desired to use the rack in the house this leaf is thrown down, the corresponding leg of the frame B—having a hole in its end—is placed on the stud $m$, and the thumb-nut $h$ at the opposite side of the rack is loosened, allowing the two frames to separate on that side, turning upon the stud $m$ and the bolt $f$ directly above it, as if on pivots.

The clothes-rack thus constructed is simple in construction, light and cheap, and yet durable, and can be used both in and out of the house.

If desired, the two frames can be entirely separated, and either used independently of the other.

Having thus fully described my invention, what I claim as new, and desire to secure by Letters Patent, is—

1. The frames A and B, provided with galvanized-iron rods C C, each rod forming at one end a hook, $b$, as and for the purposes set forth.

2. The two frames A B, in combination with connecting devices D D and G, whereby the frames A and B may be opened from one side or opened from the bottom, as and for the purpose set forth.

3. The combination of the frames A B, hinges D D, having slotted or forked leaves $d^1$ $d^1$, rod $d^2$, bolts $f$, and thumb-nuts $h$ $h$, all substantially as and for the purposes herein set forth.

In testimony that I claim the foregoing as my own I affix my signature in presence of two witnesses.

IRA WHIPPLE.

Witnesses:
 ABEL P. TANNER,
 FREDK. A. HOLMES.